(12) United States Patent
McClintic

(10) Patent No.: US 11,651,171 B2
(45) Date of Patent: *May 16, 2023

(54) ACTIVITY TIMING SYSTEM

(71) Applicant: THE HOUSTON WELLNESS PROJECT, Houston, TX (US)

(72) Inventor: Jack McClintic, Katy, TX (US)

(73) Assignee: THE HOUST, Houston, TX (US)

( * ) Notice: Subject to any disclaimer, the term of this patent is extended or adjusted under 35 U.S.C. 154(b) by 264 days.

This patent is subject to a terminal disclaimer.

(21) Appl. No.: 16/948,508

(22) Filed: Sep. 22, 2020

(65) Prior Publication Data
US 2021/0004548 A1 Jan. 7, 2021

Related U.S. Application Data

(63) Continuation of application No. 15/355,916, filed on Nov. 18, 2016, now Pat. No. 10,796,115.

(60) Provisional application No. 62/256,953, filed on Nov. 18, 2015.

(51) Int. Cl.
*G06K 7/10* (2006.01)
*G07C 1/24* (2006.01)

(52) U.S. Cl.
CPC .......... *G06K 7/10425* (2013.01); *G07C 1/24* (2013.01)

(58) Field of Classification Search
CPC .............................. G06K 7/10425; G07C 1/24
See application file for complete search history.

(56) References Cited

U.S. PATENT DOCUMENTS

| | | | | |
|---|---|---|---|---|
| 5,511,045 A * | 4/1996 | Sasaki | ........................ | G04F 8/08 368/2 |
| 8,988,223 B2 * | 3/2015 | Puleston | .................. | H04L 67/12 707/609 |
| 2009/0213700 A1 * | 8/2009 | Conant | ...................... | G04F 8/08 368/113 |
| 2010/0265801 A1 * | 10/2010 | Ehelen | ...................... | H01Q 1/40 368/9 |
| 2011/0215934 A1 * | 9/2011 | Boyd | .................. | G06Q 30/0238 340/573.1 |
| 2012/0072172 A1 * | 3/2012 | Howell | ...................... | G07C 1/24 702/178 |
| 2012/0182133 A1 * | 7/2012 | Kia | ................... | G06Q 20/40145 340/10.51 |
| 2013/0300542 A1 * | 11/2013 | Hansen | .............. | G06K 7/10425 340/10.1 |
| 2015/0302235 A1 * | 10/2015 | Kelly | .................. | G06K 7/10425 340/10.1 |
| 2016/0035143 A1 * | 2/2016 | Hansen | .............. | H04N 1/00342 348/157 |
| 2016/0203663 A1 * | 7/2016 | Proctor | .................... | G07C 9/28 340/5.61 |
| 2016/0259952 A1 * | 9/2016 | Van Rens | ................. | G07C 1/24 |

* cited by examiner

*Primary Examiner* — Edwin A. Leon
*Assistant Examiner* — Jason M Collins
(74) *Attorney, Agent, or Firm* — Ramey LLP

(57) ABSTRACT

A system of activity timing uses a radio frequency identification reader; radio frequency tags; circuit board; battery; and software to determine the elapsed time of a participant in the activity. The activity can be used for activities including, but not limited to, foot races and bicycle races.

8 Claims, 3 Drawing Sheets

ACTIVITY TIMING SYSTEM

RELATED APPLICATIONS

This application is a continuation of U.S. application Ser. No. 15/355,916, filed Nov. 18, 2016; which claims priority to U.S. Provisional Application No. 62/256,953 filed Nov. 18, 2015; each of which are incorporated by reference.

FIELD

The disclosure relates generally to activity timing. The disclosure relates specifically to a portable system for timing activity participants.

BACKGROUND

Activity timing is used to determine the time it takes for a given participant to complete the activity. Activity timing can be used for foot races, bike races, and motorized vehicle races. The activity timing allows there to be an electronic record of the finish times and the ability to time a large number of participants within a short period of time.

SUMMARY

An embodiment of the invention is an activity timing system comprising a radio frequency identification reader; radio frequency tags; a circuit board; a battery; and software on a flash memory device, wherein the software will run the activity timing system when the flash memory device is connected to the radio frequency identification reader. In an embodiment, the radio frequency tags are reusable. In an embodiment, the radio frequency tags are selected from passive, aggressive, and battery-assisted passive. In an embodiment, the radio frequency identification reader comprises two 12 volt batteries, 3 chargers, and circuitry. In an embodiment, the activity timing system further comprises a transistor, resistor, and diode.

An embodiment of the invention is a method of timing an activity comprising attaching a tag to a participant; determining a time that the participant starts an activity utilizing the activity timing system; determining a time that the participant finishes the activity utilizing the race timing system; and recording the time between the start time and finish time of the activity for the participant. In an embodiment, the radio frequency tags are reusable. In an embodiment, the radio frequency tags are selected from passive, aggressive, and battery-assisted passive. In an embodiment, the radio frequency identification reader comprises two 12 volt batteries, 3 chargers, and circuitry. In an embodiment, the activity timing system further comprises a transistor, resistor, and diode.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

Radio-frequency identification (RFID) uses electromagnetic fields for data transfer. The data transfer is wireless. RFID is used to track objects. RFID tags can be passive, active, or battery-assisted passive. In an embodiment, the RFID tags used in the present system are passive. RFID tags contain an antenna. RFID tags also contain an integrated circuit. In an embodiment, the RFID tags are reusable. In an embodiment, the RFID tags are reprogammed before the start of an activity. In an embodiment, there is backscatter from the antenna in the tag. In an embodiment, a unique number is encoded in the tag. In an embodiment, the tags utilize a 32 digit number. In an embodiment, the unique number is detected in the backscatter.

In an embodiment, the activity is a race. In an embodiment, the race is a foot race. In an embodiment, the race is a bicycle race.

Figure 1:
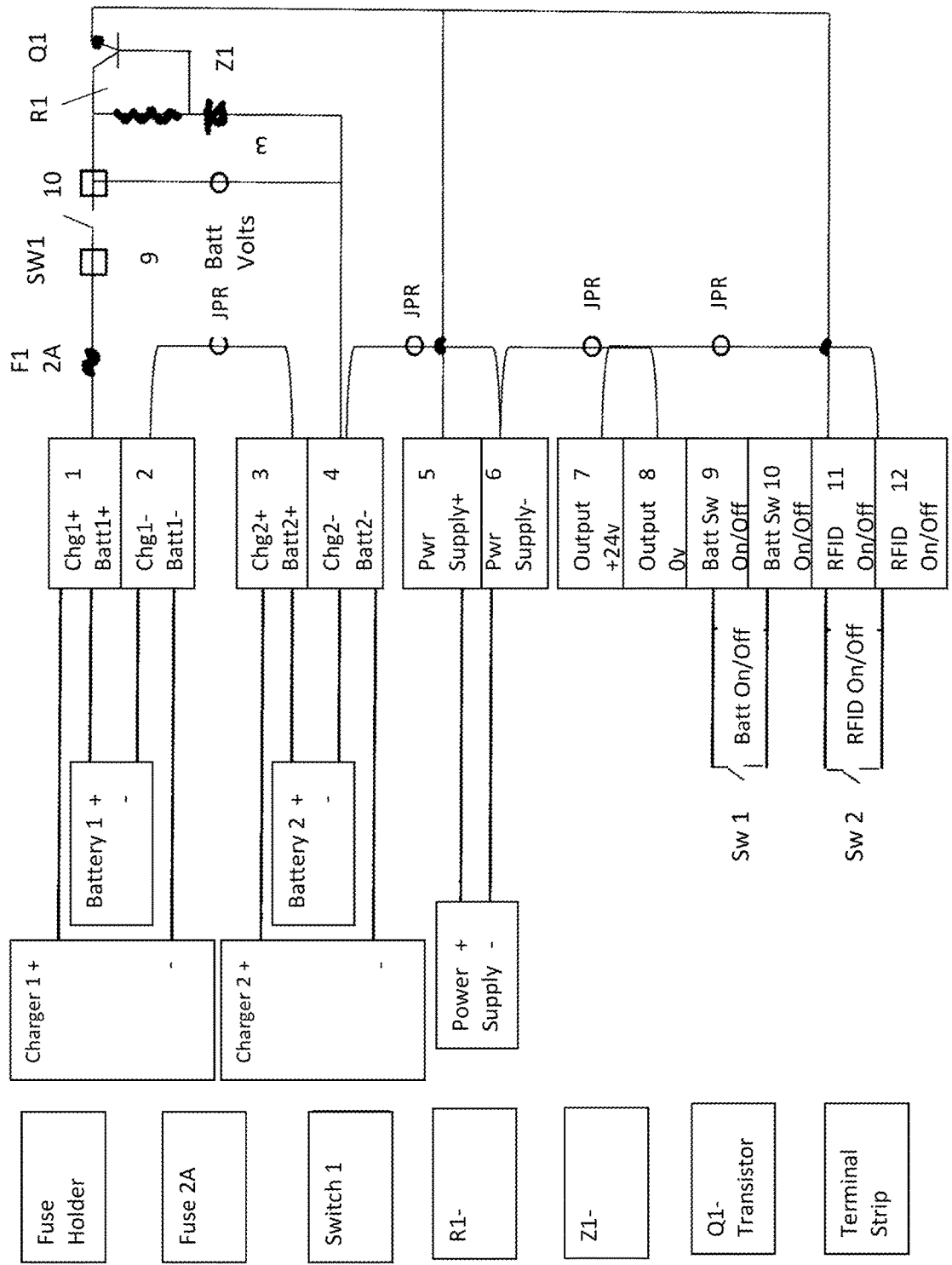
FIG. 1 depicts continuous battery backup.

FIG. 1 depicts a continuous battery backup for the RFID race timing system.

Figure 2:
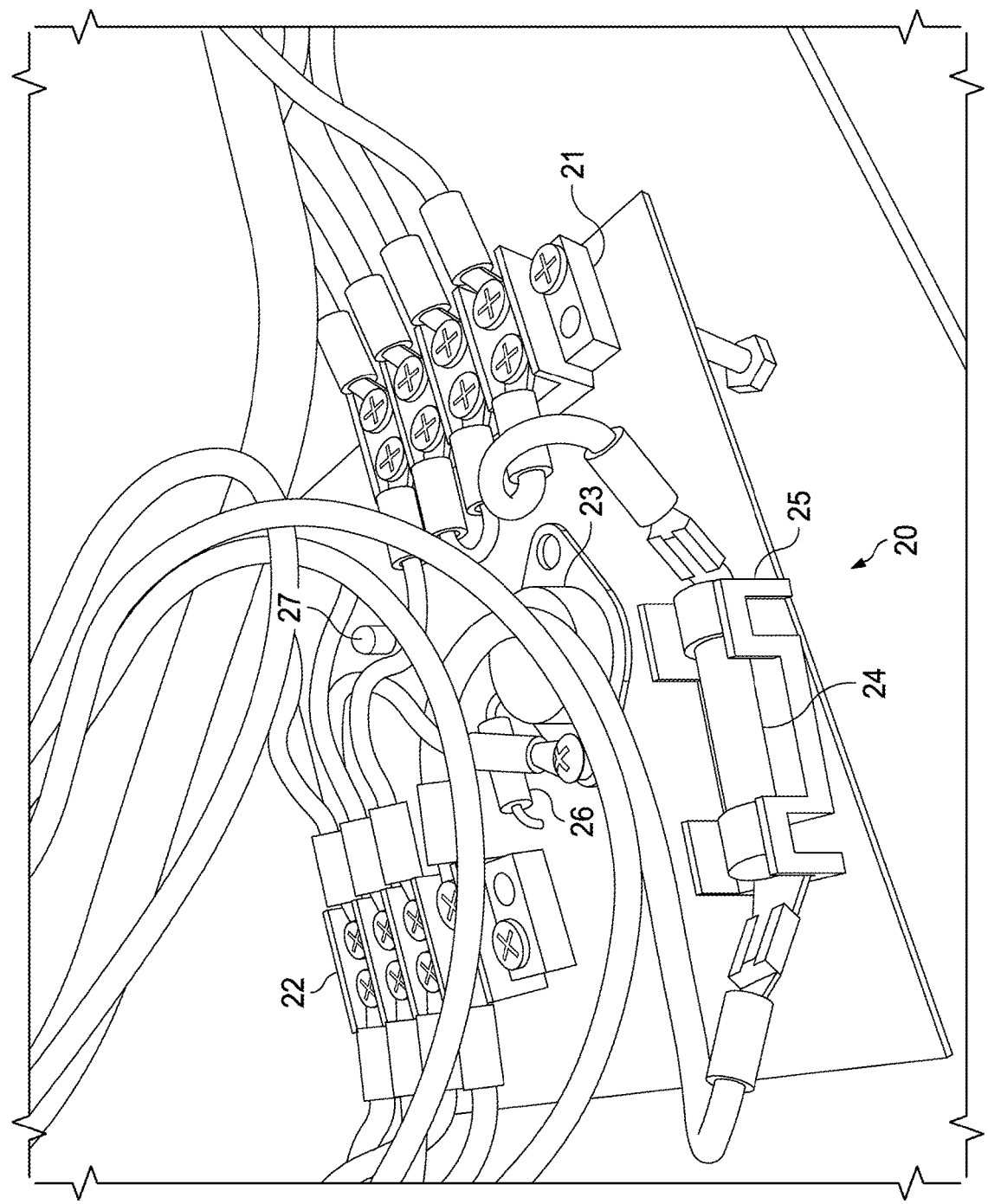
FIG. 2 depicts terminal circuit strips.

FIG. 2 depicts terminal circuit strips under the top plate. The RFID device on top and on the back corner can see that it needs 24 VDC and 1 Amp power. The power supply that comes with it is 24 VDC and 2.5 Amps. The tolerance on the device is 5% but it would be good not to drop below 1 Amp and risk a shut down. There are two terminal strips 21 and 22 with the wires connected with crimp-on connectors and screwed onto the strip to arrange circuit of the system. The largest strip 21 goes to the power supply/output and the two battery chargers (one charger for each 12 volt battery). The other strip 22 primarily has connections to the on/off switches. There is also a transistor 23, resistor 26 and diode 27 connected in the middle of the two strips. In an embodiment, a 24 VDC circuit board with the required output can be used with the 24 VDC-1 Amp device.

Figure 3:
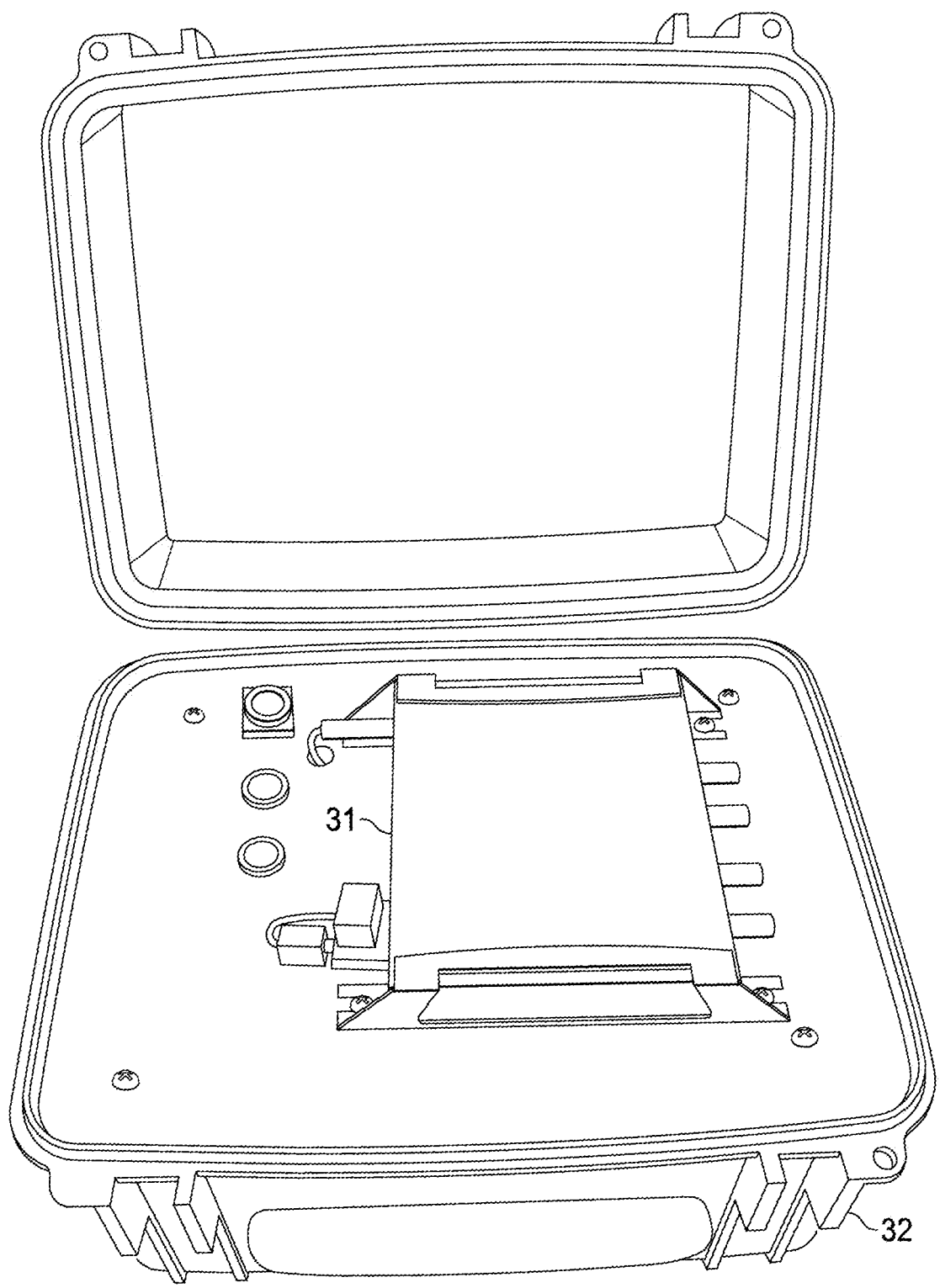
FIG. 3 depicts RFID reader and container.

FIG. 3 depicts a RFID reader 31 and polyurethane container 32. In an embodiment, the inside of the RFID reader contains two 12 volt batteries, 3 chargers, and the circuitry.

The RFID frequency used is different depending upon the purpose of the RFID tag and reader.

Low-frequency (LF: 125-134.2 kHz and 140-148.5 kHz)
High-frequency (HF: 13.56 MHz)
Ultra-high-frequency (UHF: 865-928 MHz)

The range at which the RFID tag can be read differs based on the tag.

In an embodiment, the RFID reader of the present system is an active reader.

In an embodiment, the container 32 of the run timer 20 is made from polyurethane. In an embodiment, the top of the timing component inside of the box is a steel plate with connections. In an embodiment, the container also contains at least a battery and an RFID (Impinj R420). In an embodiment, the container includes at least 4 antenna ports to connect to antennas.

In an embodiment, a software program runs the system.

It is an advantage of the present system that it is plug and play. It is a further advantage that the system is battery operated. A further advantage of the system is that the software is on flash memory. In an embodiment, the software is utilized in the RFID reader. In an embodiment, the present system does not require a motherboard.

In an embodiment, the activity timing system is high frequency. Multiple race timing systems are low frequency. The degree or angle of read range (angle of detection) for the activity timing system is dependent on the type of RFID antenna used. In an embodiment, the RFID antenna is a circular polarized UHF antenna. In an embodiment, the antenna is a Times-7 Antennas™ SlimLine—A6032. In an embodiment, the antenna has up to a 6 meter read range. In an embodiment, the frequency range of the antenna is 865-928 MHz. In an embodiment, the far-field 3 dB beamwidth is 48° in vertical and 75° in horizontal. In an embodiment, the angle of detection is known. In an embodiment, the angle of detection is determined.

In an embodiment, the object or individual to be timed possesses an RFID tag. In an embodiment, the RFID tag is located on a race number tag or bib. In another embodiment, the RFID tag is located on a shoe. In another embodiment, the RFID tag is located on an animal or a vehicle. In an embodiment, the animal is a human, horse, or dog. In an embodiment, the vehicles are bicycles, motorcycles, or cars. In an embodiment, the mats at the detection location are pointing upwards and the overhead truss at the detection location is pointing downwards. In an embodiment, the mats and overhead truss contain at least one antenna. RFID detection is based upon the proximity of the tag and antennas. In an embodiment, the tag comprises a transmitting antenna. In an embodiment, the mat and trusses contain receiving antennas. In an embodiment, the transmitting antenna is a notch antenna.

In an embodiment, there will be a mat and a truss at the beginning of the race to record the starting time for each participant. In an embodiment, there will be a mat and a truss at the end of the race to record the finishing time for each participant. In an embodiment, there are two mats and trusses at the end of the race in case one of the mats and trusses fails. In an embodiment, there will be a mat and truss at various points throughout the activity to provide times for various portions of the activity. In an embodiment, a mat and truss is located at a 5K point. In an embodiment, a mat and truss is located at a 10K point. A mat and truss can be located at whichever distances split times are desired. In an embodiment, the mats and trusses can communicate with the software wirelessly. In an embodiment, the mats and trusses communicate with the software through wires. In an embodiment, a clock will display the time elapsed from when the starting signal, including but not limited to firing of a starting pistol or blowing of a horn, occurred. In an embodiment, the clock is visible to the participants. In an embodiment, the clock is visible to observers of the activity.

In an embodiment, a computer is utilized in conjunction with the activity timing system. In an embodiment, the times of the participants will be compared to determine which participant had the shortest time. In an embodiment, a list of participants will be prepared in order of shortest time to longest time. In an embodiment, the list will be displayed on a monitor. In an embodiment, the list will be displayed on a screen. In an embodiment, information about the participant will also be stored associated with the tag number. In an embodiment, the information can contain, but is not limited to age, gender, skill level, and team. The participant information allows for the participants' times to be grouped by age groups, gender, skill levels, and team.

In an embodiment, the system contains at least two twelve volt batteries, 3 chargers, and circuitry.

The interior of the run timer contains at least two terminal strips, where all the wires are connected with crimp-on connectors, then screwed onto the strip. The largest strip goes to the power supply/output and the two battery chargers (one charger for each twelve volt battery). The other strip mainly has connections to the on/off switches. Also present are a transistor, resistor, and diode connected in the middle of the two strips. In an embodiment, a 24 volt DC circuit board can be used in the alternative.

In an embodiment, there are differences in timers for foot race, bike race, and motor vehicle race. Different timers may have an ability to detect up to a certain speed.

In an embodiment, the system utilizes a continuous battery backup. A diagram of a continuous battery backup is depicted in FIG. 1.

In an embodiment, the fuse holder 25 is a Radio Shack™ Pn #270-0739 for fuses 1¼"×¼" (34G) Mouser #576-3540602ZXGY 24.

In an embodiment, the fuse 2A is a type 3AC 1¼"×¼" Mouser 576-0312002.MXP.

In an embodiment, the switch 1 is a SPST-Rocker Radio Shack™, Pn 275-0693 Mouser 540-SR322A3DBB-NNBBBW.

In an embodiment, the R1− is an 82 ohms 5 watt Mouser 594-AC05WB22003.

In an embodiment, the Z1− is 24v Zener Diode 5 watt Mouser FB63-1N5359BG.

In an embodiment, the Q1-transistor is 2n3055 RadioShack™ #276-2041 Mouser #863-2N3055G772G.

In an embodiment, the terminal strip is a 8 pos. Radio Shack™ 2740670 Mouser 571-1546306B, 4 pos. Radio Shack™ 2740658 Mouser 571-15463064, 12 pos. Mouser 571-115463062.

Position 1 is connected to Charger 1 +, Battery 1 +.
Position 2 is connected to Charger 1 −, Battery 1 −.
Position 3 is connected to Charger 2 +, Battery 2 +.
Position 4 is connected to Charger 2 −, Battery 2 −.
Position 5 is connected to Power Supply+.
Position 6 is connected to Power Supply −.
Position 7 is Output +24 v.
Position 8 is Output 0 v.
Position 9 is connected to Switch 1 Battery On/Off.
Position 10 is connected to Switch 1 Battery On/Off.
Position 11 is Switch 2 RFID On/Off.
Position 12 is Switch 2 RFID On/Off.

The wire on the continuous battery backup is 18 awg with thin insulation. There is a fork terminal. In an embodiment, the wire is 16-18 awg.

In an embodiment, there is a PL timing box. The push on connectors for the fuse holder and battery switch are 3/16".

EXAMPLE

Example 1. Software for the Reader Controller

1 Introduction

The document provides an overview of program features and operation. It is intended for the customer and application developer. It could be the base for other documents including a requirements document, a software design description and user manuals.

2 Limitations

The Impinj Reader will only connect to one client at a time. The Simple Race Controller (SRC) application counts as that client and is started on power-up. As a result, attempts to connect to the reader with other applications, including Impinj's Multi-Reader, will be refused. The works around are to 1) modify the /cust/start script to not start the SRC application, or 2) uninstall the SRC application.

3 Delivery and Installation

The application is delivered as a single file, src.upg. This is a package containing several files. It should be installed according to the Impinj Installation and Operations manual, pages 27 and 28. In an embodiment, subsequent releases will have a version number in the filename, i.e. src101.upg.

4 RFID Reader Control 4.1 Configuration 4.1.1 Antenna Power

The antenna transmit power is set to the maximum allowed by the reader. The reader is queried to report its maximum and the value is used. This value is 32.5 dB for the Impinj Speedway Revolution. This value is over the regulatory maximum of 30 dB to compensate for cable losses.

4.1.2 Software Filter

The list of tags is queried every 200 ms. The time recorded is the "firstseen." The peak RSSI read during the 200 ms interval is available for future use. If determined that the tag was read within the past 5 seconds, the read record is discarded. Otherwise, it is recorded.

4.1.3 Mode

To duplicate Speed Connect settings used previously, the reader is configured for Autoset Dense Mode. This corresponds to a Gen2 RF Control Mode Index of 1000. Likewise, the Gen2 Singulation Control Session is set to 2 and the search mode is set to Dual Target.

4.2 Tag Processing

The tags read are expected to provide EPC 96 bit (base 2) values encoded as BCD (Binary Coded Decimal)
1) The 96 bit value is converted to a 24 digit base 16 number.
2) The least significant four digits are kept and the balance discarded.
3) Each of the four remaining digits are verified to be equal to or between 0 and 9. If a digit is equal to or between A and F, then the tag is ignored and not recorded.
4) The digits are converted to a bib number, base 10, equal to or between 0000 and 9999.

5 System Setup 5.1 Application Startup

The application is started via a start script in the /cust/start directory. The script:

Makes the config and data directories if needed,
Erases data files older than 30 days,
Start the application, and
Provides the Reader Identifier to the application.

5.2 Configuration 5.2.1 Operating System Shell

The operation system shell password is set to 'developer.' This should not be necessary. See the Impinj Embedded Developer's Guide for usage instructions.

5.2.2 File Transfer Protocol (FTP)

FTP access on the reader is enabled. This is contrary to Impinj's recommendations for end users. The user name is root and the password is Impinj.

5.2.3 Telnet Server

Telnet access is enabled.

6 File Management 6.1 Flash Drive

When a flash drive is inserted or the reader is powered on while a flash drive is inserted, the application will:
1) copy all of the data files to the flash drive,
2) begin to append a copy of all subsequent tag records to the current data file, and
3) copy a new configuration file from the drive, if it exists.

The configuration file should be named src.conf and be located in a /dos/src directory on the flash drive. In an embodiment, there is no configuration file. In an embodiment, there is a configuration file. In an embodiment, there is not a check to ensure available file space on the flash drive. In an embodiment, there is a check to ensure available file space on the flash drive.

6.2 Custom Application Partition

The tags are recorded on files on the reader's custom application partition (cap). They are placed in the subdirectory, /cust/data. This partition is about 8 megabytes. There is enough room for about 400,000 tag reads. The lifetime of the partition is limited and unknown. To extend this life, writes are limited to once every 3 minutes. The NAND device on the Speedway Revolution 420 is rated for 100,000 cycles.

6.3 Tag Format

A typical record will like this "1,1393,14091893-23352834" where, the first field is the antenna number, the
second field is the bib number, and the
last field is the number of microseconds since Jan. 1, 1970 12:00 A.M.

6.4 File Name

The data file name is formatted, PREFIX-YYYY-MM-DD-HHMMSS.csv where
PREFIX Reader identifier set in the /cust/start script.
YYYY Year
MM Month
DD Day
HH Hour, 24 hour clock
MM Minutes
SS Seconds The time used is the start time of the application, usually power-up. A single file is created each time the application is started.

7 Screen Emulation

The application will write all tag reads to the "USB Device" port when connected.

8 System Logging

Application errors are written to the system log. Please review the Impinj UHF Gen 2 RFID Speedway Revolution Installation and Operations Guide for instruction on how to read these logs.

9 Annunciator

To support an annunciator device, the General Purpose Output #1 is triggered with each valid tag. The port is active low. The pulse is made active for 100 ms. After which, it will remain inactive for at least 75 ms prior to signaling another tag. If tags are read at a pace greater than 5 per second, the signals will queue. For example, if 10 tags are read at once. Each tag will be signaled one at a time and this will take 1.75 seconds to finish. During this period, the reader will recognize other tags as they are presented.

Note: When the reader is powered on, the default state of the output is ON. It will remain ON until the SRC embedded application can take control and turn it off. Once SRC has control, it will turn the buzzer off for one second, on for one second and then off again for one second to provide audible feedback that the buzzer is working properly. It may take ten or more seconds for the reader to boot and provide control SRC. During this time the buzzer will be active.

The pulse was tuned to handle a cheap hand constructed prototype to prove and test the concept. The parts were obtained from Radio Shack™:

| Part Number | Description | Quantity |
| --- | --- | --- |
| 2761501 | D-Sub Connector, Male, 15-pin, High Density, solder cups | 1 |
| 2761508 | 9- and 15-Position Shielded Metal D-Sub Connector Hood | 1 |
| 2730793 | 6 VDC Mini Buzzer, 75 dB at 30 cm, piezo electric, 45 mA | 1 |
| 2730054 | 75 DB Piezo Electric Buzzer, 6 VDC, 20 mA | 0 |
| 2781627 | 6" Heat-Shrink Tubing (12-Pack) | 1 |

Connections:

| From | To |
| --- | --- |
| DSUB, Pin 1 | DSUB, Pin 5 |
| DSUB, Pin 6 | DSUB, PIN 7 |
| BZR, RED | DSUB, Pin 5 |
| BZR, BLK | DSUB, Pin 8 |

APPENDIX A

In an embodiment, record the time stamp of the tag read when the tag is first read. In an embodiment, record the time stamp of the tag read with the highest return power rather than when the tag is first read.

In an embodiment, the continuous operation with 8 tags in the field of view could fill up the flash drive in 72 hours. In an embodiment, there is a check for available file space. In an embodiment, this may use 5% or more of the expected life of the flash device.

APPENDIX B—SAMPLE INSTALLATION

In an embodiment, existing custom applications are removed. In an embodiment, existing custom applications are not removed.

In an embodiment, the reader is set in a known configuration. From the Speedway Revolution Octane 4.12 RShell Reference Manual, pages 7 and 8, issue the 'config image default' and 'config image removecap' commands.

In an embodiment, windows telnet is used to connect to the reader. Note: Windows telnet may need to be enable on the computer. If so, in the control panel, go to programs and features, turn windows features on and off, telnet client. From the command prompt, whatever the reader is addressed at (i.e., 192.168.1.200), should be typed following telnet (i.e., telnet 192.168.1.200).

After the reader reboots, it is necessary to find its new address. By default, the reader will use DHCP to get an IP address from the router. In an embodiment, an individual can log into the router and browse the DHCP client table to find the reader at a given IP address, i.e., 192.168.1.133.

Install the upgrade

First browse to the reader's home page with a browser.

Next, click the choose file button in the reader upgrade area and choose the delivered src.upg file.

Next, click the Red Upgrade button.

A screen update should appear. In an embodiment, the refresh timer can count down from 15 seconds twice.

When it is finished, "Waiting for manual reboot message." should be visible.

Click the Red Reboot button.

Confirm by clicking OK when the confirmation box appears.

Next, on mine, the reboot refresh timer counted down from 60 seconds.

Next, the screen refreshed and the program is running Application Confirmation

There are two quick ways to tell if the application is running One, the antenna status lights should be blinking as they are actively scanning for tags. Second, the reader's web page should now indicate the "Application SW Version." In an embodiment, it is "1.0.0.0"

In an embodiment, a third test is to connect the USB port into the computer and watch the tags roll in. The following depicts the capture of some "screen emulation" tags.

1,1702,1409615088502514
1,1702,1409615088066485
1,7760,1409615090615230
1,7745,1409615090604284
1,1350,1409615090343070
1,1702,1409615090013695
1,5555,1409615089947666
1,1393,1409615089848734
1,0005,1409615089832128
1,1702,1409615089780030
1,1702,1409615095347471
1,7760,1409615095332503
1,7745,1409615095331948
1,1702,1409615095331293
1,1393,1409615095330503
1,1350,1409615095329459
1,5555,1409615095327453
1,0005,1409615095326885

APPENDIX C—RETRIEVE FILES WITH FTP

Download and install a FTP Client (i.e., FileZilla).
a. Browse to http://www.ninite.com
b. Select FileZilla under Developer Tools
c. Click Get Installer and install the program
Run FileZilla
Fill in the Host, Username, password and Port.

| Item | Value |
| --- | --- |
| Host | Reader's IP address |
| Username | root |
| Password | impinj |
| Port | 21 |

Click Quickconnect

The screen areas are arranged as:

| Area | Description |
|---|---|
| Top | Status Print Out |
| Left | Local Files (laptop) |
| Right | Remote Files (reader) |
| Bottom | Transfer Status |

Under Remote Site, click the "/". This is the root directory.

Now click the cust directory

Next Click the data directory

In an embodiment, there should should be a list of csv files under the Remote Site Area.

In the "Local" area. Find the working directory to be used and select it.

Select the CSV files to be used and transfer them from the Remote Directory.

Right Click and Choose Download

The CSV files will show up in the Local Directory.

Close FileZilla and the files are ready for processing.

All of the compositions and methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and methods and in the steps or in the sequence of steps of the methods described herein without departing from the concept, spirit and scope of the disclosure. More specifically, it will be apparent that certain agents which are related may be substituted for the agents described herein while the same or similar results would be achieved. All such similar substitutes and modifications apparent to those skilled in the art are deemed to be within the spirit, scope and concept of the disclosure as defined by the appended claims.

What is claimed is:

1. An activity timing system comprising
   a radio frequency identification reader;
   radio frequency tags;
   a first antenna at a beginning location of an activity and a second antenna at an end location of the activity;
   wherein upon the proximity of the radio frequency identification reader and the radio frequency tags, the radio frequency identification reader reads the radio frequency tags; and
   wherein the radio frequency identification reader is queried to report its maximum return power and time stamps of the radio frequency tags are recorded with the maximum return power when the radio frequency tags reach the first antenna and the second antenna, wherein the time stamps are used to determine a start time of the activity and to determine a finish time of the activity respectively.

2. The activity timing system of claim 1 wherein the radio frequency identification reader and the radio frequency tags work on low frequency.

3. The activity timing system of claim 1 wherein the radio frequency identification reader and the radio frequency tags work on high frequency.

4. The activity timing system of claim 1 wherein the radio frequency identification reader and the radio frequency tags work on Ultra-high frequency.

5. The activity timing system of claim 4, wherein the first antenna and the second antenna are circular polarized UHF antenna.

6. A method of timing an activity comprising
   attaching a tag to a participant;
   determining a time that the participant starts an activity utilizing the activity timing system of claim 1;
   determining a time that the participant finishes the activity utilizing the race timing system of claim 1; and
   recording the time between the start time and finish time of the activity for the participant.

7. The method of timing an activity of claim 6 wherein the activity is a race.

8. The method of timing an activity of claim 7 wherein the race is a foot race or a bicycle race.

\* \* \* \* \*